United States Patent [19]

Engibarov

[11] Patent Number: 5,509,644
[45] Date of Patent: Apr. 23, 1996

[54] MODIFIED T-SLOT ARRANGEMENT

[76] Inventor: Eddy Engibarov, c/o E.Z.E. Machine Company, 616 Onderdonk Ave., Ridgewood, N.Y. 11385

[21] Appl. No.: 371,165

[22] Filed: Jan. 11, 1995

[51] Int. Cl.⁶ ...................................................... B23Q 3/02
[52] U.S. Cl. ............................................................ 269/99
[58] Field of Search ......................... 269/99, 100, 91–94, 269/900, 283, 305, 247, 252

[56] References Cited

U.S. PATENT DOCUMENTS

| | | | |
|---|---|---|---|
| 945,914 | 1/1910 | Colwell | 269/283 |
| 2,127,008 | 8/1938 | Petersen | 269/297 |
| 2,139,292 | 12/1938 | Tramsak | 269/247 |
| 4,078,782 | 3/1978 | Carlson | 269/283 |
| 4,251,066 | 2/1981 | Bowling | 269/283 |
| 4,763,887 | 8/1988 | Yang | 269/247 |
| 5,244,193 | 9/1993 | Hehr | 269/99 |

FOREIGN PATENT DOCUMENTS

| | | | |
|---|---|---|---|
| 983095 | 2/1951 | France | 269/283 |
| 527255 | 5/1955 | Italy | 269/100 |
| 750885 | 9/1983 | U.S.S.R. | 269/100 |

Primary Examiner—Robert C. Watson
Attorney, Agent, or Firm—Helfgott & Karas

[57] ABSTRACT

A modified T-slot arrangement is provided for firmly holding objects to be fastened to a holding surface. A mounting member is provided with outwardly flaring inclined surfaces to cooperate with a mating member having similar surfaces. The outer surface of the mating member may serve as the holding surface. When a fastening force is applied to the mounting member through the object, the outwardly flaring arm portions of the mounting member are urged firmly against the cooperating surfaces of the mating member with a force greater than if the arm portions were not inclined.

16 Claims, 2 Drawing Sheets

MODIFIED T-SLOT ARRANGEMENT

The present invention relates to a modified T-slot arrangement and more particularly to support arrangements which can firmly hold an object for on which work is to be performed.

BACKGROUND OF THE INVENTION

In the field of machine tools such as milling and grinding machines, it is essential that an object on which work is to be performed be firmly supported in some particular position so that machining, polishing, etc. can be done with great precision.

Different types of arrangements are used to hold such objects and it is important that a vise for holding the object, for example, be itself firmly supported on a machining table. One vise arrangement that has been used, for example, is described in U.S. Pat. No. 5,056,766 assigned to the same assignee as the present application. Such patent shows that a vise for holding a workpiece can be supported in a machine table having an inverted T-shaped slot. A support member for the vise could be slideably arranged in the inverted T-shaped slot and have cooperating surfaces to be positioned anywhere along the length of the slot. In this way, a vise could be fastened to the support member and tightened in position.

One such prior art arrangement is shown in FIG. 1. Referring to FIG. 1, the inverted T-support member 10 can be seen slideably arranged within a channel of a machining surface 11 of machine tool. The support member 10 has a lower elongated body portion 12 which is slideably engaged with the lower portion of the inverted T-shaped channel and an upper neck portion 13 which is slideably engaged with the narrower portion of the channel. Threaded holes 14 are provided in the upper surface portion of the support member 10. These threaded holes are adapted to have objects fastened thereto by screws or other fastening members threaded into the threaded holes 14. One such arrangement is shown in FIG. 3 where an object 20 is fastened to the support member 10 by an allen head machine bolt 21.

A cross-section of FIG. 1 is shown in FIG. 2 so that the construction of the prior art support member arrangement can be seen more clearly.

While the inverted T-shaped support member arrangement works adequately for most purposes, there are some disadvantages to this arrangement.

In FIG. 4 a force diagram is shown for the prior art apparatus indicated in FIGS. 1–3. It can be seen that if a force $F_y$ is applied pulling the neck portion of the support member vertically upwardly, equal and opposite forces $F_y/2$ will be developed on the upper surfaces of the portion 12 of the support member 10.

Another inverted T-slot arrangement is shown in U.S. Pat. No. 5,060,920 assigned to the same assignee as the present invention. In addition to the T-slot arrangement such as that shown in FIG. 1 of the present application, this patent shows a dovetail arrangement formed as part of a gripping jaw for a workpiece holder in FIGS. 4 and 5 thereof.

Referring to FIG. 5 of the present application a cross-sectional view of dovetail member 71 is shown arranged in a channel 72 of a holding member 73. While the dovetail member 71 has two angled or inclined arms 74 and 76, it can be seen that the holding member 73 has one planar surface 77 and one angled or inclined surface 78.

The dovetail member 71 is mounted in the channel 72 by a cone tipped bolt 79 which is pressed against the angled surface of arm 74 to urge the angled surfaces 76 of member 71 against the angled surface 78 of the holding member 73. This arrangement is satisfactory for the intended purpose of having a quick release jaw mechanism.

SUMMARY OF THE INVENTION

Accordingly it is an object of the present invention to provide a support arrangement for firmly holding objects to be fastened to a holding surface and more efficiently using the holding forces applied in the support arrangement.

Another object is to provide a modified T-slot arrangement having a dovetail cross-section.

A further object is to provide a modified T-slot arrangement having at least a partial dovetail cross-section.

In accordance with the present invention, a modified T-slot arrangement is provided for firmly holding objects to be fastened to a holding surface by a fastening force. The arrangement included a first mounting member adapted to be fastened to the object and having a neck portion with a substantially planar outer surface, arm portions and a foot portion. The arm portions have at least partial planar sections inclined with respect to the planar surface of the neck portion and with respect to the foot portion. A mating member is also provided having an outer surface adapted to serve as the holding surface and inner surfaces adapted to receive the neck, arm, and foot portions of the holding member therein in cooperative relationship. Thus, when a fastening force is applied to the holding member through the object in a direction substantially perpendicular to the planar surface of the neck portion, the arm portions of the mounting member are urged against the respective cooperating surfaces of the mating member to firmly hold the object to the holding surface.

A DETAILED DESCRIPTION OF THE DRAWINGS

The novel features of invention are set forth in the appended claims. The invention itself, together with further objects and advantages thereof, may best be understood by reference to the following description taken in conjunction with the accompanying drawings, in which:

Figure 6:
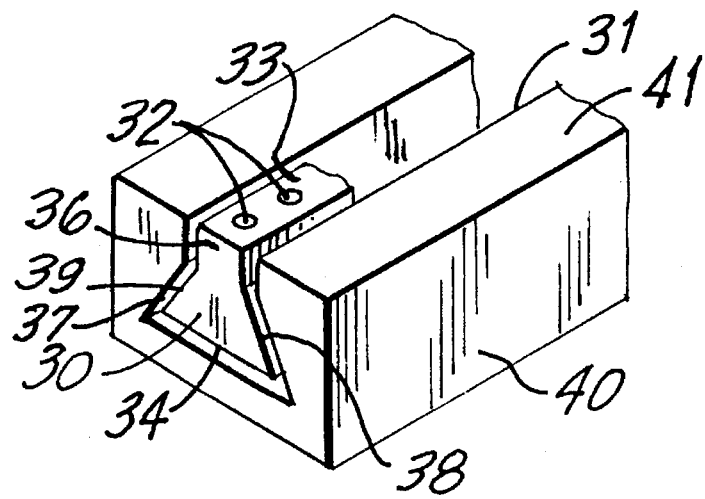
FIG. 6 is a perspective view of a modified T-slot arrangement according to a first embodiment of the present invention.
Figure 7A:
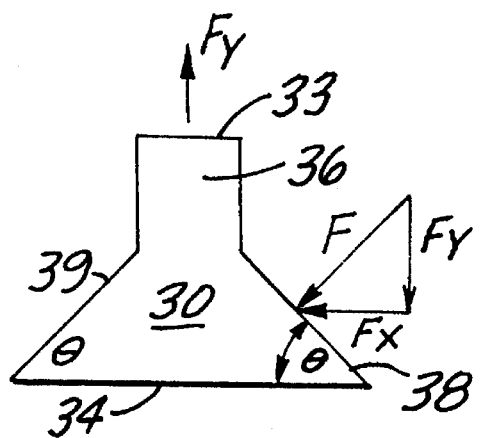
Figure 8:
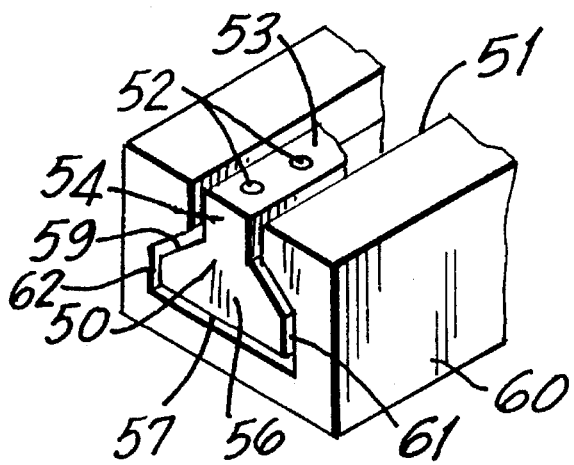
Figure 7B:
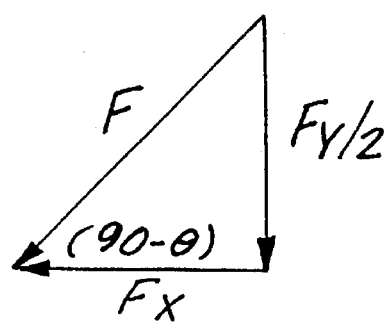

FIG. 7 including sub FIGS. 7(A) and 7(B) show a force diagram of the arrangement shown in FIG. 6; and FIG. 8 is a perspective view of a further embodiment of the present invention.

DETAILED DESCRIPTION OF THE INVENTION

Referring to the drawings and more particularly to FIG. 6, a mounting member 30 is shown slideably arranged in a channel 31 within a mating member 40. The mating member 40 may be a machining table of a machine tool. For example, the mating member 40 has an upper surface 41 which may serve as a holding surface for an object such as 20 in FIG. 3. The mounting member 30 has two threaded holes 32 arranged in the upper outer surface 33. Mounting member 30 has an upper outer surface 33 and a lower outer surface 34. Surfaces 33 and 34 are substantially planar and parallel to each other.

In addition, mounting member 30 has an upper neck portion 36 and a lower foot portion 37. The lower foot portion 37 has arm portions 38 and 39 with inclined outwardly flaring surfaces extending from the neck portion 36 to the lower planar surface 34. The inclined surfaces 38 and 39 form a substantially trapezoidal arrangement.

The advantages of the inclined surface arrangement of the arm portions 38 and 39 shown in FIG. 6 can be demonstrated by referring to the force diagram in FIG. 7(a). In FIG. 7(a), a force $F_y$ is shown urging the mounting member 30 upwardly. The forces applied to the inclined surfaces 38 and 39 due to the cooperating inclined surfaces of the channel within the mating member 40 are shown as force F applied perpendicularly to the inclined surface 38 in FIG. 7(a).

That is when an object is to be firmly fastened to the holding surface 41 of the mating member 40, the mounting member 30 is moved along the channel 31 of member 40 to the desired position. Here, the object, which may be a vise, or the like, has fastening means such as a machine bolt pass through the object into one or more of the threaded holes 32 in the mounting member 30.

Figure 4:
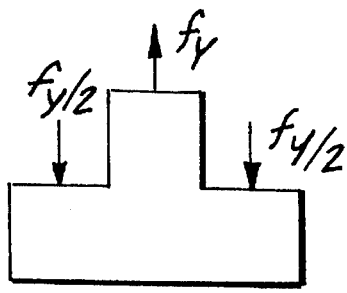
FIG. 4 is a force diagram of the prior art arrangement shown in FIG. 3.
Figure 5:
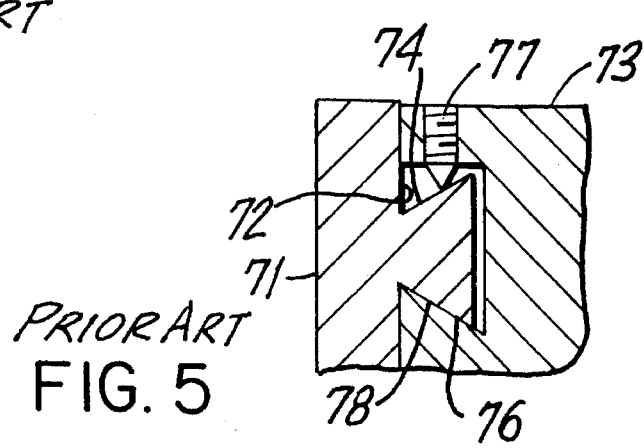
FIG. 5 is a cross sectional view of another prior art arrangement.

As the bolt is tightened in the hole 32, a force $F_y$ urges the mounting member 40 upwardly (in the position shown) against the cooperating surfaces of the channel 31. Since the force $F_y$ is applied perpendicularly to the substantiating planar surface 33 of the mounting member, a total equal and opposite force would be applied to the arm portions of member 40 if they had the shape shown in FIG. 4. That is, a force $f_y/2$ would be applied to such surfaces. However such is not the case with the outwardly extending inclined arm portions 38 and 39 of the member 30 incorporating the principles of the present invention.

Refer to a larger version of the force diagram as shown in FIG. 7B. Here it is seen that the force vector F can be broken up into two perpendicular forces, one vertical force $F_y/2$ and one horizontal force $F_y$. The vertical force $F_y/2$ is identical to the force diagram arrangement of FIG. 4 of the prior art since one half of the vertically applied force $F_y$ will be applied in the vertical direction to the upwardly urged support member 30. If the angle between the incline surface 38 and the lower planar surface 34 is 0 then the angle between the force vector $F_y$ and the horizontally directed force F will be 90-θ. The force F applied to the incline surface 38 could be solved from the following equations $$\sin(90° - \theta) = \frac{F_y}{2} \times \frac{1}{F} \text{ ; therefore} \quad (1)$$

$$F = \frac{F_y}{2} \times \frac{1}{\sin(90° - \theta)} \quad (2)$$

Thus, if the angle between the incline surface 38 and the surface 34 is 45° for example, the resulting force F will be solved by the following equation:

$$F = \frac{F_y}{2} \cdot \frac{1}{(.707)} = .707 F_y. \quad (3)$$

It is clear therefore that with the arrangement shown in FIG. 6 the force F that is applied against the inclined surface 38 will be 0.707$F_y$ rather than $F_y/2$. Of course the same analysis applies to the inclined surface 39.

Thus, it has been demonstrated that for the same vertically upward force $F_y$ the support member 38 and 39 will provide an opposite holding and supporting force of 0.707y when θ is 45°. Of course, this can be changed by changing the angle θ in accordance with the equation (2) above. Thus, as the angle θ increases the force (F) applied against the inclined surfaces will also increase. It should also be noted that when the angle between the inclined surface 38 and the surface 34 is equal to the angle between the inclined surface 39 and the surface 34, the bottom portion forms the base of an isosceles triangle.

Figure 3:
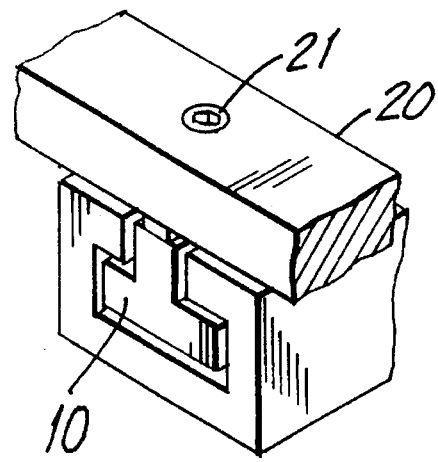
FIG. 3 is a perspective view of the prior art arrangement of FIG. 1 showing an object mounted thereon.

Therefore, if an object such as 20 shown in FIG. 3 is fastened to the support member 30 of FIG. 6, it will take less applied holding force to provide the same amount of clamping for the object. That is, if the same amount of force is applied, a greater amount of clamping is provided. This clearly permits the use of smaller bolts, less bolts, and less massive support of member 40.

A second embodiment of the present invention is shown in FIG. 8. In this embodiment, a mounting member 50 is arranged in a channel 51 of a mating member 60. It is clear that the support member 50 can slide to a desired position in the channel 51 of the member 60. The support member 50 has threaded holes 52 arranged in the upper planar surface 53 thereof in the same manner as in the previous embodiment. In this embodiment however the support member is arranged with an upper vertical neck portion of 54 and a lower foot portion 56. The member 50 also has a lower substantially planar outer surface 57. The foot portion 56 of the support member 50 is provided with inclined outwardly flaring arm portions 58 and 59. However, these inclined surfaces do not extend all the way to the bottom of the surface 57. Instead, further outer surfaces 61 and 62 are arranged between the inclined surfaces of 58 and 59 respectively and the lower outer surface 57. The further outer surfaces 61 and 62 are substantially perpendicular to the lower outer surface 57.

Figure 1:
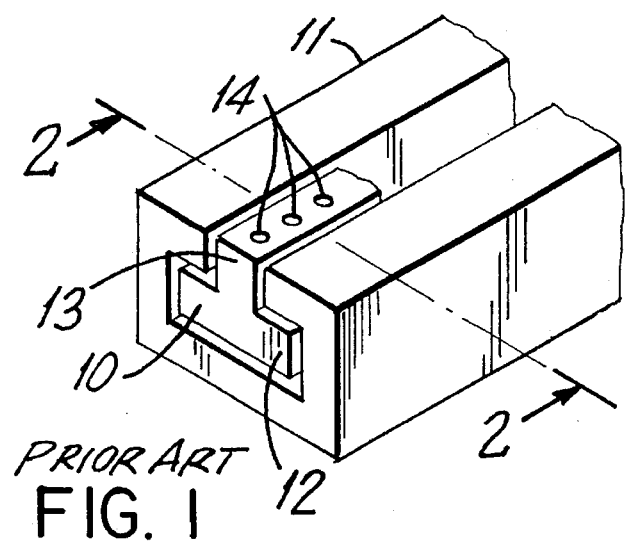
FIG. 1 is a perspective view of a prior art mounting arrangement.
Figure 2:
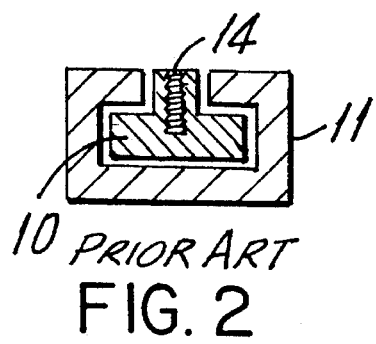
FIG. 2 is a cross-sectional view of FIG. 1 taken along the line 2 2 of FIG. 1.

With this arrangement, the same force analysis will show that the downward force provided by the inclined surfaces 58 and 59 will again be greater than that shown in the prior art arrangement of FIG. 1.

Of course, it is clear that additional modifications can be made to take advantage of the inclined surface arrangement between the neck portion of the support member which is to be fastened to the object and the foot or body portion which is slideably arranged in the channel within the mating member.

Although two particular embodiments of the invention have been set forth herein, many modifications may be made and it is intended by the appended claims to cover such modifications that fall within the general scope of the spirit of described invention.

What is claimed is:

1. A modified T-slot arrangement for firmly holding objects to be fastened to a holding surface by a fastening force comprising a first mounting member adapted to be fastened to said object and having a neck portion with a substantially planar outer surface, arm portions and a foot portion, said arm portions having at least partial planar sections inclined with respect to said planar outer surface of said neck and with respect to said foot portion; a mating member having an outer surface adapted to serve as said holding surface and inner surfaces adapted to receive said neck, arm and foot portions of said holding member therein in cooperative relationship, whereby when a fastening force is applied to said holding member through said object in a direction substantially perpendicular to said planar outer surface of said neck portion, said arm portions of said mounting member are urged against the respective cooperating surfaces of said mating member to firmly hold said object to said holding surface.

2. The modified T-slot arrangement of claim 1 wherein said mating member is fixedly mounted on a support and said first mounting member is slideably arranged in said mating member.

3. The modified T-slot arrangement of claim 1 wherein said foot portion of said mounting member has a surface which is substantially planar and parallel to said planar outer surface of said neck portion and said fastening force is applied substantially perpendicular to said substantially planar surface of said foot portion.

4. The modified T-slot arrangement of claim 3 wherein each of said inclined sections of said arm portions forms an angle of at least 45° with said substantially planar surface of said foot portion.

5. The modified T-slot arrangement of claim 3 wherein said first mounting member has further outer surfaces arranged between said inclined sections of said arm portions and said foot portion.

6. The modified T-slot arrangement of claim 5 wherein said further outer surfaces are substantially perpendicular to said surface of said substantially planar outer foot portion.

7. The T-slot arrangement claimed in claim 1 wherein said mating member has inner surfaces in the form of a channel adapted to slideably engage said mounting member.

8. A modified T-slot arrangement for firmly holding objects to be fastened to a holding surface comprising a first mounting member adapted to be fastened to said object and having a dovetail cross section with a neck portion having a substantially planar outer surface and wall sections substantially perpendicular to said substantially planar outer surface, arm portions and a foot portion, said arm portions having planar sections inclined with respect to said substantially outer planar surface of said neck and respectively extending between said wall sections and said foot portion, a mating member having an outer surface adapted to serve as said holding surface, first inner walls for slideably engaging said wall sections of said neck portion, inclined inner walls for respectively engaging said planar sections of said arm portions and a further inner wall for engaging said foot portion of said mounting member, whereby when a fastening force is applied to said mounting member through said object in a direction substantially perpendicular to said substantially planar outer surface of said neck portion, said arm portions of said holding member are urged against said inclined inner walls of said mating member to firmly hold said object to said holding surface.

9. The modified T-slot arrangement of claim 8 wherein said inner walls of said mating member form one continuous surface as a channel for slideably engaging said first mounting member.

10. The modified T-slot arrangement of claim 8 wherein said foot portion of said mounting member has a surface which is substantially planar and parallel to said outer surface of said neck portion and said fastening force is applied substantially perpendicular to said substantially planar surface of said foot portion.

11. The modified T-slot arrangement of claim 10 wherein each of said inclined sections of said arm portions form an angle of at least 45° with said substantially planar surface of said foot portion.

12. The modified T-slot arrangement of claim 10 wherein said first mounting member has further outer surfaces arranged between said inclined sections of said arm portions and said foot portion.

13. The modified T-slot arrangement of claim 12 wherein said further outer surfaces are substantially perpendicular to said surface of said substantially planar foot portion.

14. A modified T-slot arrangement as claimed in claim 8 wherein said arm portions and said foot portion of said first mounting member form the base of an isosceles triangle.

15. A modified T-slot arrangement as claimed in claim 1 wherein said planar sections of said arm portions form equal and opposite angles with said foot portion.

16. A modified T-slot arrangement as claimed in claim 3 wherein said planar sections of said arm portions form equal and opposite angles with said substantially planar surface of said foot portion.

* * * * *